(12) United States Patent
Burgess et al.

(10) Patent No.: US 10,857,454 B2
(45) Date of Patent: Dec. 8, 2020

(54) GAMES CONTROLLER

(71) Applicant: Ironburg Inventions Limited, Wincanton (GB)

(72) Inventors: Simon Burgess, Cossington (GB); Duncan Ironmonger, Atlanta, GA (US)

(73) Assignee: Ironburg Inventions Limited, Wincanton (GB)

(*) Notice: Subject to any disclaimer, the term of this patent is extended or adjusted under 35 U.S.C. 154(b) by 0 days.

(21) Appl. No.: 16/384,181

(22) Filed: Apr. 15, 2019

(65) Prior Publication Data
US 2019/0255432 A1    Aug. 22, 2019

Related U.S. Application Data

(63) Continuation of application No. 15/113,152, filed as application No. PCT/EP2015/051290 on Jan. 22, 2015, now Pat. No. 10,258,877.

(60) Provisional application No. 61/930,065, filed on Jan. 22, 2014.

(51) Int. Cl.
*A63F 13/24*   (2014.01)
*A63F 13/22*   (2014.01)

(52) U.S. Cl.
CPC .............. *A63F 13/24* (2014.09); *A63F 13/22* (2014.09)

(58) Field of Classification Search
CPC .......... A63F 13/20; A63F 13/22; A63F 13/23; A63F 13/235; A63F 13/24; A63F 13/40; A63F 13/837
See application file for complete search history.

(56) References Cited

U.S. PATENT DOCUMENTS

| 2006/0025271 | A1* | 2/2006 | Egawa | F16H 1/32 |
| | | | | 475/163 |
| 2014/0142419 | A1* | 5/2014 | Shalgi | A61B 6/5211 |
| | | | | 600/424 |
| 2014/0323220 | A1* | 10/2014 | Lee | A63F 13/00 |
| | | | | 463/37 |

* cited by examiner

*Primary Examiner* — Omkar A Deodhar
*Assistant Examiner* — Shauna-Kay Hall
(74) *Attorney, Agent, or Firm* — Walters & Wasylyna LLC

(57) ABSTRACT

A game controller for controlling electronic games includes a controller chassis and an actuator system including: an actuator body pivotally mounted to the controller chassis; a strike plate coupled to the actuator body; a trigger adjustment system having an arm; and an actuator adjustment control screw received in a screw thread disposed within said arm. A portion of the actuator adjustment control screw may engage with a portion of the strike plate and the portion of the actuator adjustment control screw creates an end stop to limit movement of the actuator body.

20 Claims, 17 Drawing Sheets

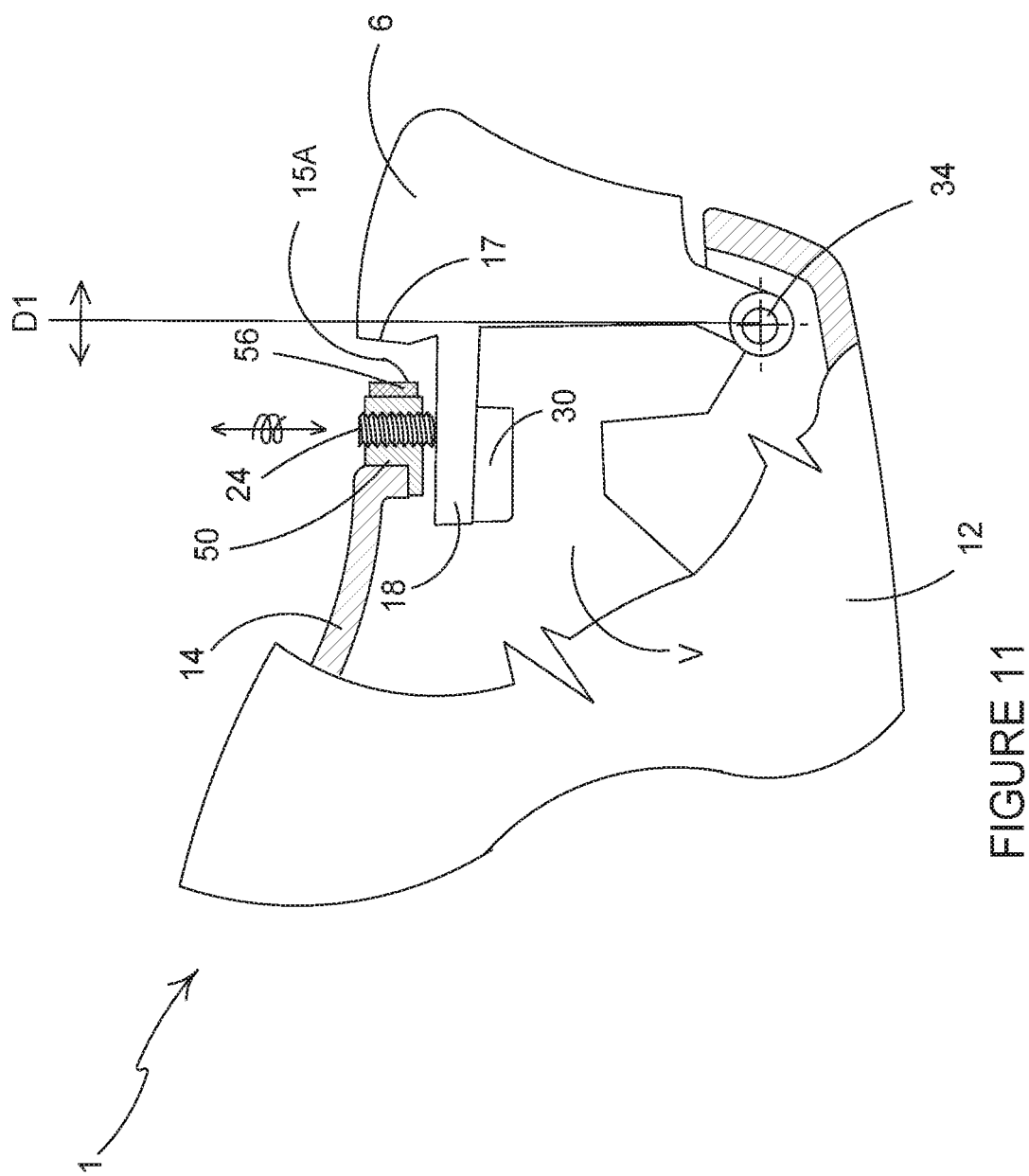

GAMES CONTROLLER

This application is a continuation of U.S. Ser. No. 15/113,152 filed on Jul. 21, 2016, which is a U.S. national phase application of Intl. App. No. PCT/EP2015/051290 filed on Jan. 22, 2015, which claims priority from U.S. Ser. No. 61/930,065 filed on Jan. 22, 2014. The entire contents of U.S. Ser. No. 15/113,152, Intl. App. No. PCT/EP2015/051290 and U.S. Ser. No. 61/930,065 are incorporated herein by reference.

FIELD

The invention relates to controllers for controlling the play of computerised games; more particularly, but not exclusively, the invention relates to an actuator system of a game controller for a gaming console.

BACKGROUND

There are many different types of gaming consoles currently available for operating a video game. For example Microsoft®, Sony® and Nintendo® manufacture the Xbox®, PlayStation® and Wii® gaming consoles, respectively. The gaming consoles typically include a game controller so that a user can control the operation of the video game.

Some known game controllers include a form of actuator system for the operation of control of the functions of the video games. Actuators, buttons or other depressible or manually operable devices are typically used for controlling discrete actions such as the firing of a weapon or issuing an attack command. It is known to provide a button or actuator which is intended to be operable by the index finger of a user; such buttons are commonly known as triggers.

At times, dependent upon the video game being played, it can be necessary to depress the trigger a distance before the trigger initiation point is reached and the command actually acknowledged. This renders part of the depressing action futile. Likewise, after the command has been operated, it is often possible to carry out further depression of the trigger past the trigger initiation point. This further depression is unnecessary and may also be disadvantageous.

Furthermore, in other situations in some video games, the strength of a command is increased or decreased in dependence upon how frequently the trigger is depressed. As such, depressing the trigger the whole distance is unnecessary and excessive for the command or operation required.

It is desirable to have a controller, particularly for gaming applications, that is more responsive or has less scope for allowing unnecessary over-movement by the user of the controller.

Due to the rapidly expanding gaming market and development of involved games invoking considerable player input, it is desirable for players to be able to customise their controllers in order to gain increased control in a variety of gaming circumstances.

The present invention seeks to improve upon, or at least mitigate, some of the problems associated with controllers of the prior art by providing a game controller which includes an adjustable trigger system that has a mechanism to allow the end user to control or recalibrate the maximum and/or minimum trigger positions.

SUMMARY

There are a variety of different commands available for the trigger functions of a game controller and the adjustable trigger system of the present invention now provides the option to customise the trigger settings in order to suit the individual game at the time of operation.

In some embodiments, the trigger system includes an adjustment to the depressible range of the trigger so that effectively the trigger is already, to some degree, "depressed" before any contact is actually made with the trigger by the operator (player).

In some embodiments, the trigger system includes an adjustment to the extent that the trigger is depressed before no further motion can be effected by the operator. This removes any unnecessary distance being traveled by the trigger, which may be referred to herein as "over travel".

The present invention provides a method of controlling both of the above features simultaneously to limit the amount of depression inflicted on the trigger without contact; and to limit the range of available motion (i.e. limit over travel) to allow individual users to tailor a controller to suit their game play and promote optimum performance in a variety of gaming circumstances.

According to an aspect of the invention there is provided an apparatus for supplying user inputs to a computer program, such as a game program, for controlling the game program, the apparatus comprising an outer case; at least one depressible trigger mechanism; and a mechanism for manual adjustment of the range of motion of the at least one trigger mechanism, said mechanism for manual adjustment being disposed within an internal volume defined by the outer case of the apparatus.

According to another aspect of the invention there is provided an apparatus for supplying user inputs to a computer program, such as a game program for controlling the game program, the apparatus comprising at least one depressible trigger mechanism and a first mechanism for adjusting a first end stop position of a depressible trigger mechanism.

Optionally, the apparatus comprises a second mechanism for manual adjustment of a second end stop position of the at least one depressible trigger mechanism.

According to a further aspect of the invention there is provided a game controller for controlling electronic games, the game controller comprising a housing, at least one depressible trigger body at least in part exposed relative to the housing, said at least one depressible trigger body being in operational association with electrical circuitry contained within the housing, which electrical circuitry is controlled by depression of the at least one depressible trigger body for manipulating electrical outputs of the electrical circuitry for controlling electronic games, and the game controller having a mechanism which provides for manual adjustment of a depressible range of the at least one depressible trigger body mechanism.

According to yet another aspect of the invention there is provided a game controller for controlling electronic games comprising:
  a controller chassis and an actuator system including:
    an actuator body pivotally mounted to the controller chassis;
    a strike plate coupled to the actuator body;
    a trigger adjustment system having an arm; and
    an actuator adjustment control screw received in a bore disposed within said arm;
  wherein a portion of the actuator adjustment control screw engages with a portion of the strike plate and said portion of the actuator adjustment control screw creates an end stop to limit movement of the actuator body.
  Optionally, the bore comprises an internal screw thread.

Optionally, a portion of said arm forms a second end stop to limit movement of the actuator body.

Optionally, the game controller comprises an outer case defining a void and wherein the trigger adjustment system is mounted within the void.

In some embodiments, the game controller comprises a removable cover panel for accessing and adjusting the trigger adjustment system.

In some embodiments, the game controller comprises an aperture in the outer case for receiving an adjustment tool for adjusting the position of the control screw of the trigger adjustment system.

Optionally, the actuator body is a trigger button.

According to a still further aspect of the invention there is provided an actuator adjustment system for adjusting the range of travel of an actuator in a game controller, the actuator adjustment system comprising:
- a base plate for mounting the actuator adjustment system to a game controller body;
- a riser coupled to the base plate; and
- an arm extending from the riser,
    wherein the arm comprises a bore for receiving an actuator adjustment control screw for adjusting the range of travel of the actuator and a strike plate for arresting motion of the actuator.

Optionally, the bore comprises an internal screw thread.

According to still yet another aspect of the invention there is provided an apparatus for supplying user inputs to a computer program, such as a game program, for controlling the game program, the apparatus comprising an outer case having a removable cover portion; at least one depressible trigger device; and a mechanism for manual adjustment of a range of motion of the at least one depressible trigger device, said mechanism being mounted to an internal surface of the removable cover portion, such that when the removable cover portion is coupled to the apparatus the mechanism is disposed within an internal volume defined by the outer case of the apparatus.

According to another aspect of the invention there is provided a game controller for controlling electronic games comprising:
- a controller chassis and an actuator system including:
    - an actuator body pivotally mounted to the controller chassis;
    - a strike plate coupled to the actuator body;
    - a removable cover portion mountable to the controller chassis, the removable cover portion comprising:
        - a trigger adjustment system having a housing; and
        - an actuator adjustment control screw received in a bore disposed within said housing;
    - wherein a portion of the actuator adjustment control screw engages with a portion of the strike plate and said portion of the actuator adjustment control screw creates a first end stop to limit movement of the actuator body.

Optionally, a portion of said housing forms a second end stop to limit movement of the actuator body.

Optionally, the game controller comprises an aperture in the removable cover portion for receiving an adjustment tool for adjusting the trigger adjustment system.

According to still another aspect of the invention there is provided a method of adjusting the range of movement of an actuator on a game controller for controlling electronic games, the method comprising:
(i) providing a game controller including:
- a controller chassis;
- an actuator body pivotally mounted to the controller chassis;
- a strike plate coupled to the actuator body;
- an actuator adjustment system; and
- an actuator adjustment control screw received in a screw thread disposed within said actuator adjustment system, wherein a portion of the actuator adjustment control screw engages with a portion of the strike plate and said portion of the actuator adjustment control screw creates an end stop to limit the actuator movement, and (ii) rotating said trigger adjustment control screw to adjust the position of said end stop.

Optionally, the game controller includes a removable cover panel, and the method comprises: removing the removable cover panel to gain access to the trigger adjustment control screw.

Optionally, the game controller includes a removable cover panel, and the method comprises: removing the removable cover panel to remove the trigger adjustment system.

Alternatively, the game controller includes a removable cover panel, and the method comprises: removing the removable cover panel to remove the trigger adjustment system.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which:

FIG. 11 is a cross sectional view of the trigger mechanism of FIG. 6 including the mechanism for adjusting trigger travel motion wherein the trigger body is illustrated in a first position;

DETAILED DESCRIPTION

Detailed descriptions of specific embodiments of game controllers and trigger mechanisms are disclosed herein. It will be understood that the disclosed embodiments are merely examples of the way in which certain aspects of the invention can be implemented and do not represent an exhaustive list of all of the ways the invention may be embodied. Indeed, it will be understood that the game controllers and trigger mechanisms described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
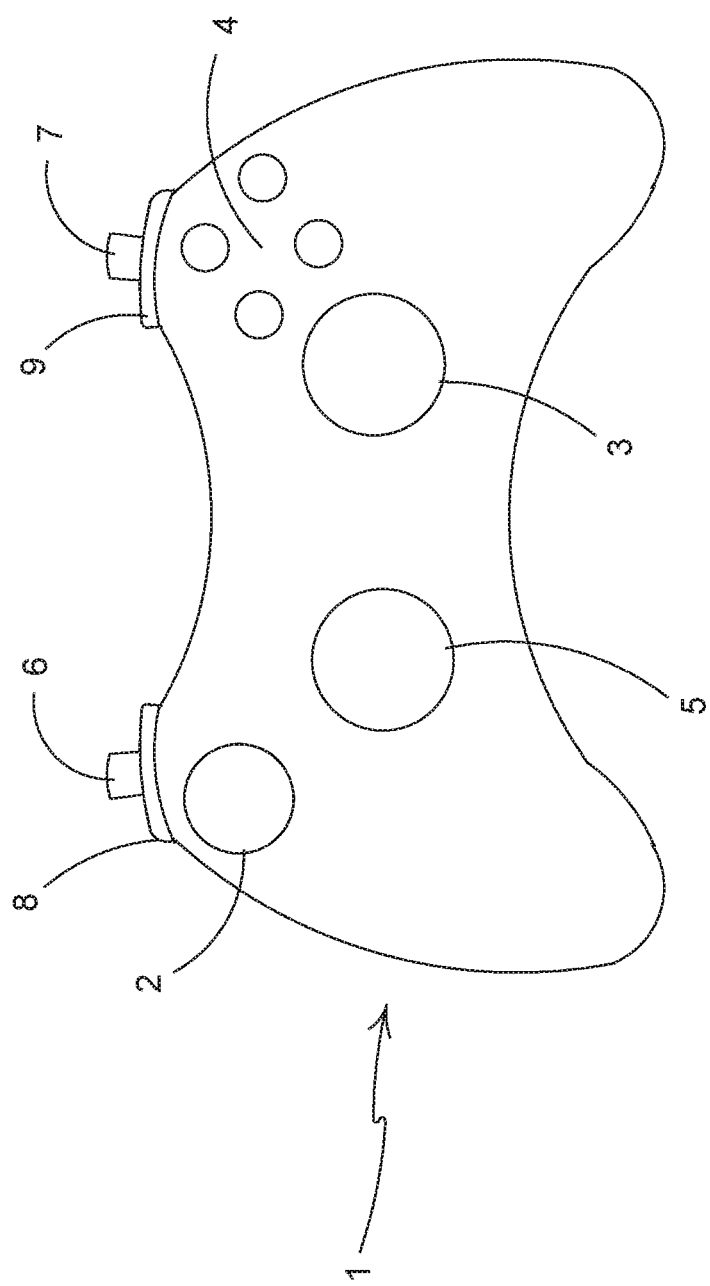
FIG. 1 is a plan view of a controller for a games console.

Referring to FIG. 1, there is shown a controller 1 according to an embodiment of the invention. The controller 1 comprises a mechanism for adjusting trigger travel motion; both the start position and the end position of the trigger movement are adjusted by the mechanism.

The controller 1 comprises an arrangement of game controls that are mounted on the front and top of the controller 1. The controller 1 comprises a left analogue thumb stick 2 and a right analogue thumb stick 3. The left analogue thumb stick 2 and the right analogue thumb stick 3 normally control movement actions and are intended to be operated by the user's left and right thumbs respectively. The controller 1 comprises four buttons 4, located on a front-right portion of the controller 1, which normally control additional in-game actions and that are intended to be operated by the user's right thumb. The controller 1 comprises a direction pad 5 located on the lower portion of the front-left of the controller 1. The direction pad 5 is intended to be operated by the user's left thumb, and typically is used as either an alternative to the left thumb stick 2 or to provide additional actions. The controller 1 also comprises a left trigger body 6, a right trigger body 7, a left bumper 8 and a right bumper 9 located on the front edge of the controller 1. The left and right trigger bodies 6, 7 are typically operated by a user's index or forefingers. The left and right bumpers 8, 9 may also be operated by a user's index or forefingers. It will be understood that the arrangement of game controls illustrated in respect of the present embodiment is optional and may vary in other games controllers embodying the present invention, which may be applied to a variety of depressible triggers and actuators as described below.

Figure 2:
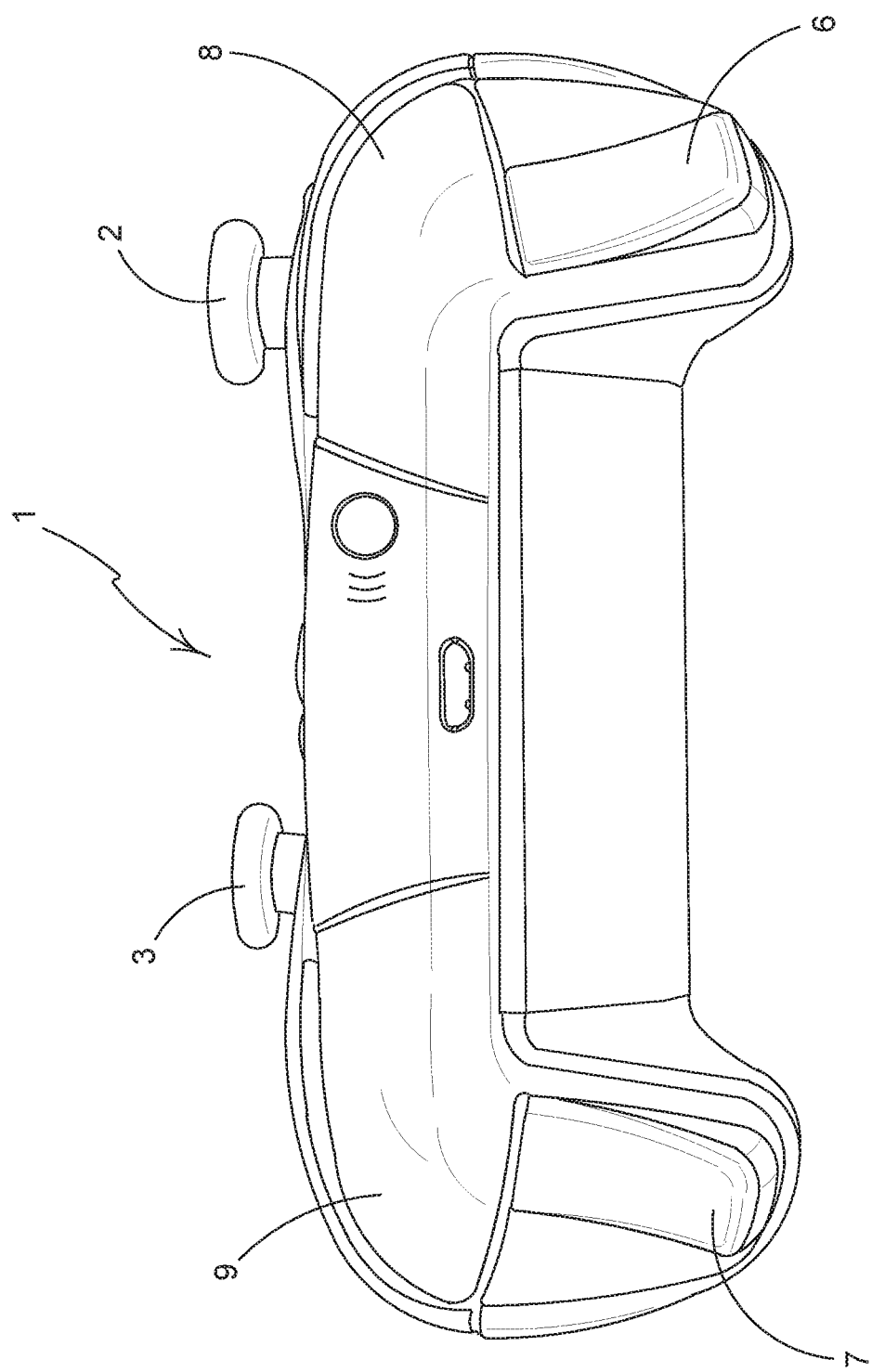
FIG. 2 is a front view of the controller of FIG. 1.

FIG. 2 illustrates a front view of the controller of FIG. 1. It can be seen that the left trigger body 6 is mounted below the left bumper 8 and the right trigger body 7 is mounted below the right bumper 9.

Figure 3:
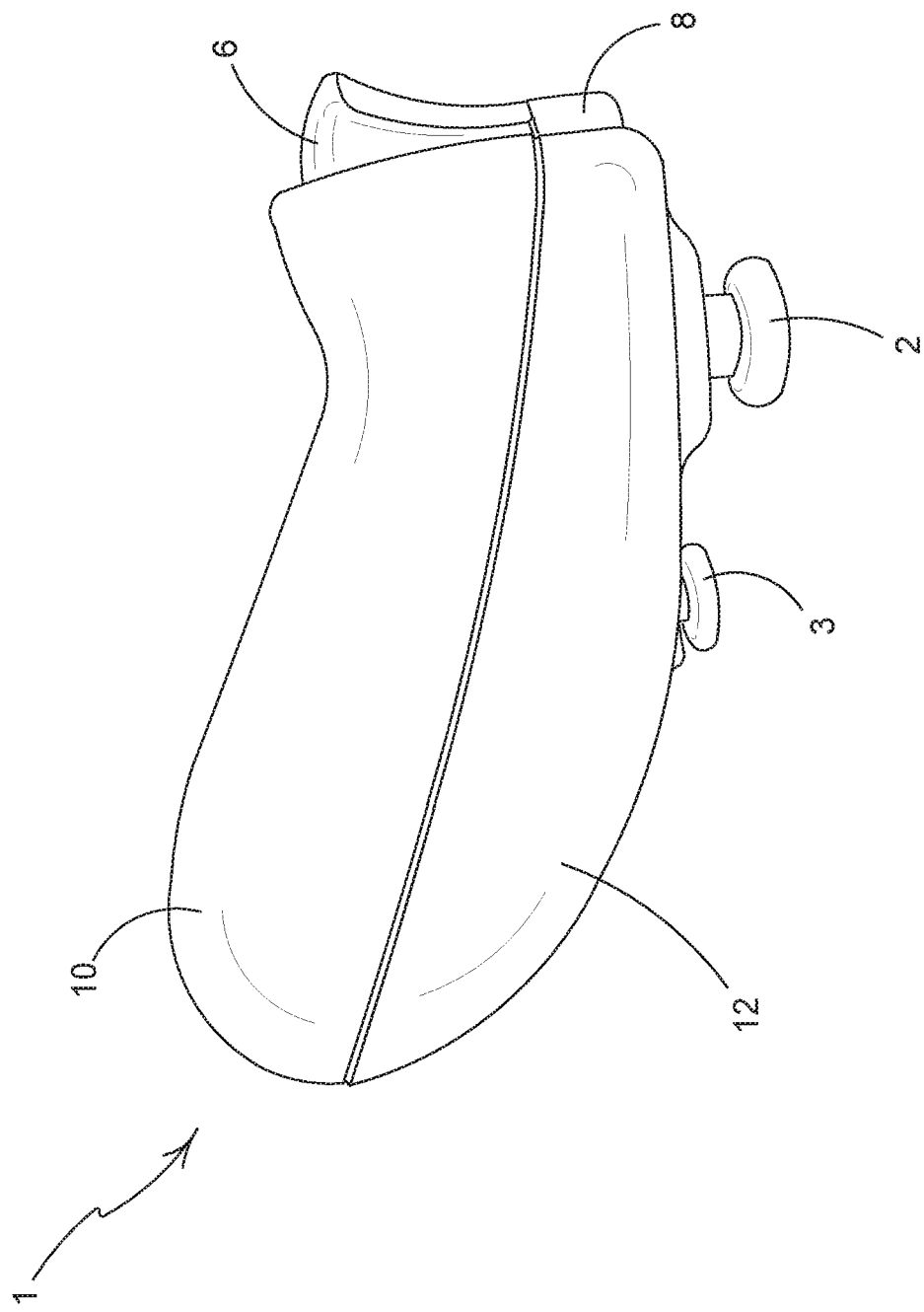
FIG. 3 is a side view of a controller of FIG. 1.
Figure 4:
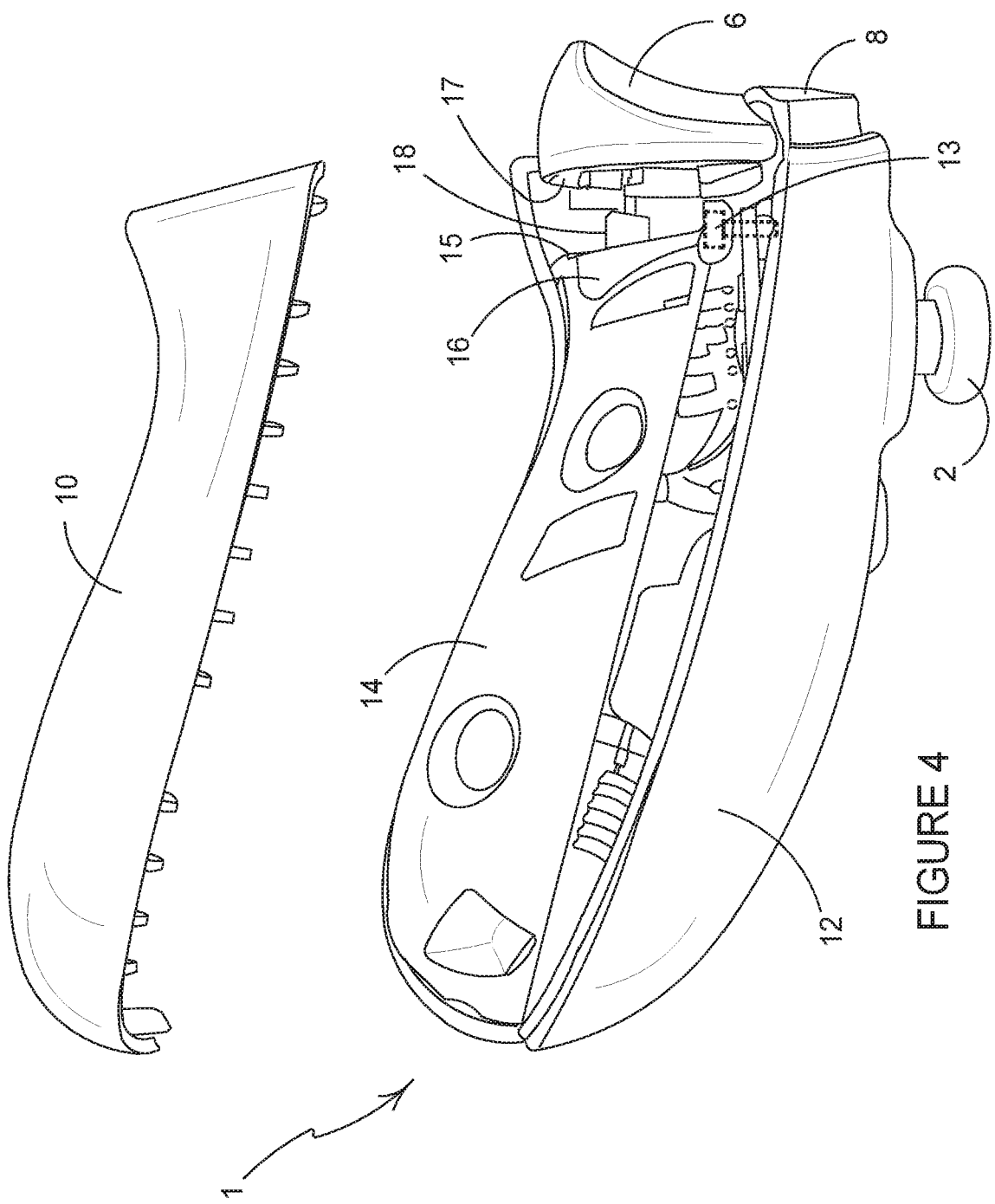
FIG. 4 is an exploded side view of the controller of FIG. 1 showing a removable cover portion.

Referring now to FIGS. 3 and 4, the controller 1 comprises a removable cover portion 10 which is detachably coupled to a base chassis member 14. The base chassis member 14 is coupled to a top panel 12.

The base chassis member 14 and the top panel 12 define a void 'V' in which a printed circuit board (not shown) is located. The printed circuit board comprises control electronics (not shown) to which the controls 2, 3, 4, 5, 6, 7, 8, 9 of the controller 1 are coupled. An inner chassis member (not shown) is provided in the void 'V'; the printed circuit board is fixed to the inner chassis member.

Figure 6:
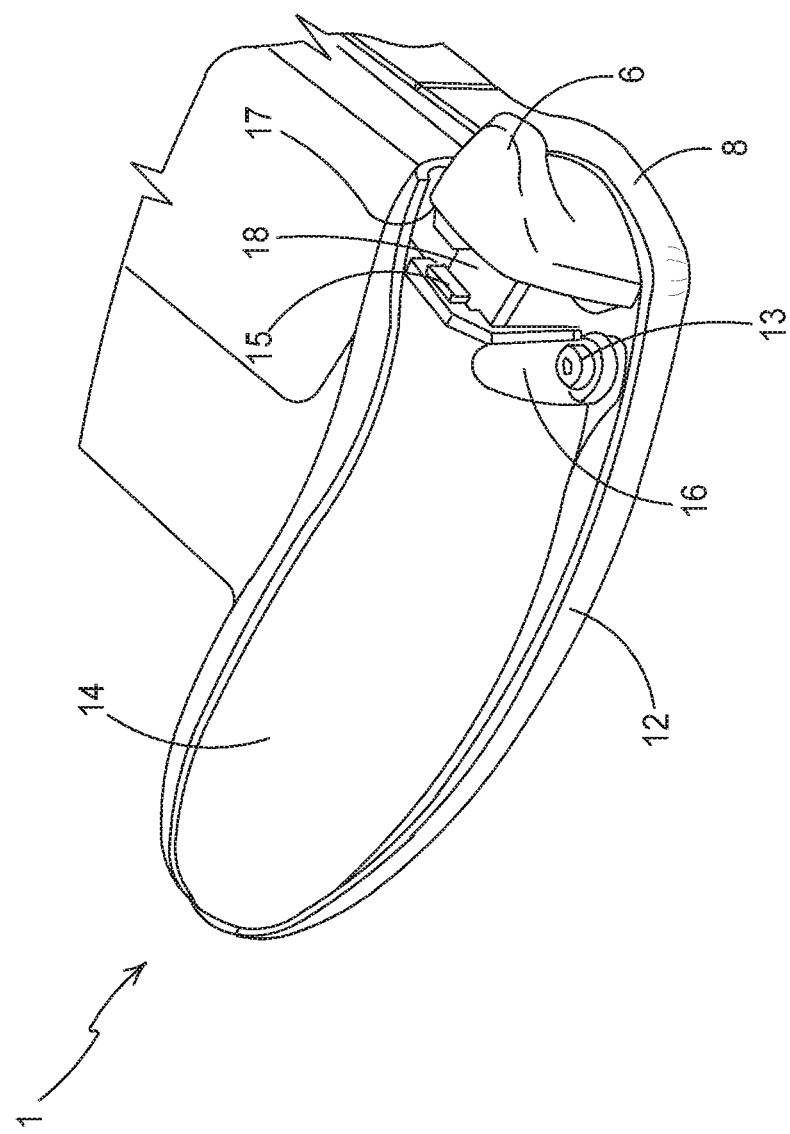
FIG. 6 is a perspective view from below of a portion of the controller of FIG. 1 in which the removable cover portion has been removed to expose the trigger mechanism.

The base chassis member 14 comprises a cutaway or recess 16 (see FIGS. 4 and 6) disposed at a front edge thereof. The recess 16 is adjacent to, or facing at least in part, a rear edge 17 of the left trigger 6. A fixing device 13 in the form of a screw is disposed in the recess 16 and secures the base chassis member 14 to the top panel 12. Optionally, the printed circuit board and the inner chassis member are disposed between the base chassis member 14 and the top panel 12 and are secured in position by the fixing device 13. The fixing device 13 passes through an aperture or cutaway provided in the recess 16, through apertures in each of the printed circuit board and the inner chassis member, and into a closed or concealed bore defined within the top panel 12. By 'concealed bore', it is meant that the bore does not pass through the top panel 12.

A limb 18 extends from the rear of the left trigger 6 into the void 'V' between the base chassis member 14 and the top panel 12. The limb 18 comprises a magnet 30 (see FIG. 7) attached thereto. The controller 1 determines, senses, or otherwise detects, the position of the magnet 30 relative to a sensor (not shown) that is provided on the printed circuit board (or in the void 'V') to determine the position or orientation, or to sense movement of, the left trigger body 6.

A front edge 15 of the base chassis member 14 defines an end stop which limits the movement of the left trigger 6. The front edge 15 of the base chassis member 14 may comprise a cushion member 56 to soften the impact of the left trigger body 6 at the end stop. In such an arrangement, the end stop position of the left trigger body 6 may actually be defined by a part of the cushion member 56. The left trigger body 6 is pivotally or rotationally mounted to the inner chassis member, or in alternative embodiments to the top panel 12. The left trigger body 6 is resiliently biased to return to a start position. Together the left trigger body 6, its pivotal mount to the inner chassis and/or the resilient bias, may be referred to herein as, a depressible trigger mechanism.

Figure 5:
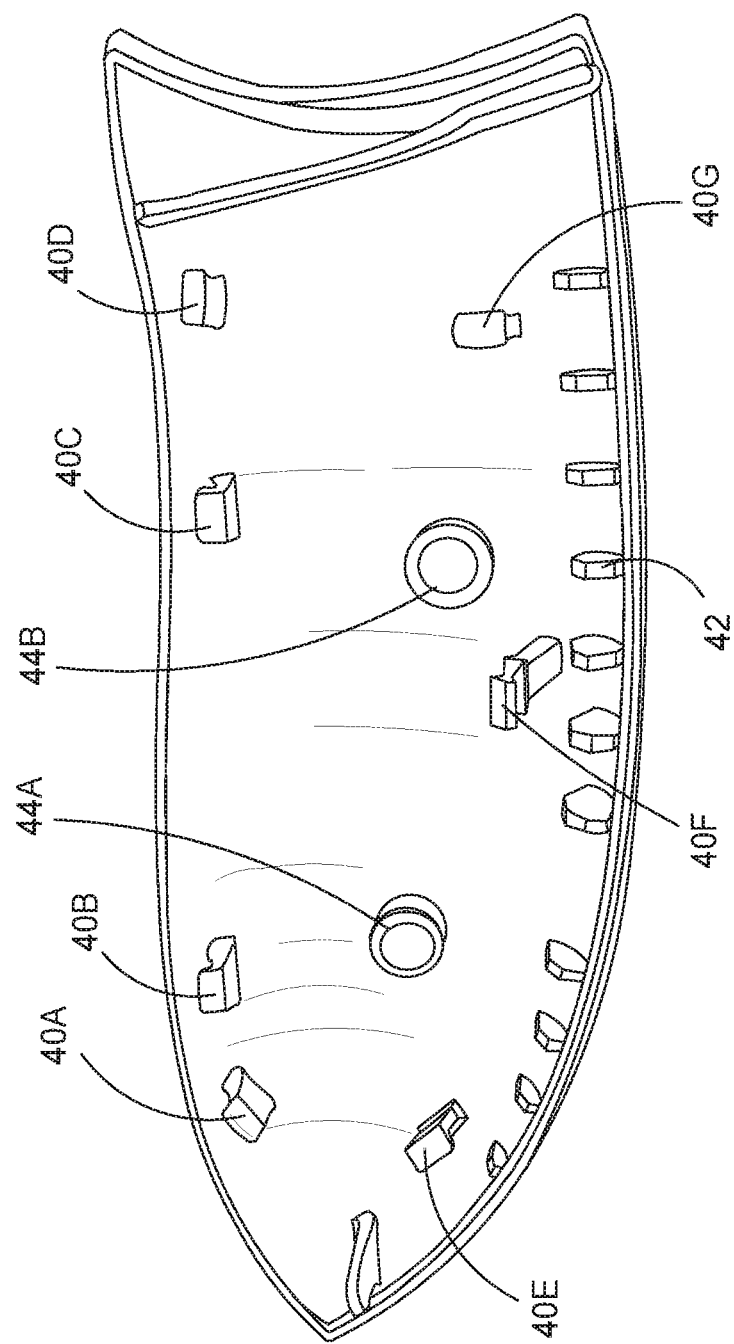
FIG. 5 is a perspective view from below of an internal surface of the removable cover portion shown in FIG. 4.

FIG. 5 shows an internal surface of the removable portion 10. The removable portion 10 forms a grip or handle portion of the controller 1. The inner surface comprises a plurality of locating devices 44A, 44B, which facilitate correct alignment of the removable portion 10 with the base chassis member 14. The inner surface also comprises a plurality of ribs 42. Ribs 42 provide strength to the removable portion 10 and aid in alignment of the removable portion 10 to the base chassis member 14. The inner surface also comprises a plurality of protrusions 40A, 40B, 40C, 40D, 40E, 40F, 40G. Each of the plurality of protrusions 40A, 40B, 40C, 40D, 40E, 40F, 40G forms a first part of a complementary locking mechanism for locking the removable portion 10 to the base chassis member 14. The base chassis member 14 comprises a plurality of second parts of the complementary locking mechanism, optionally in the form of apertures, recesses or cut away portions.

Figure 8:
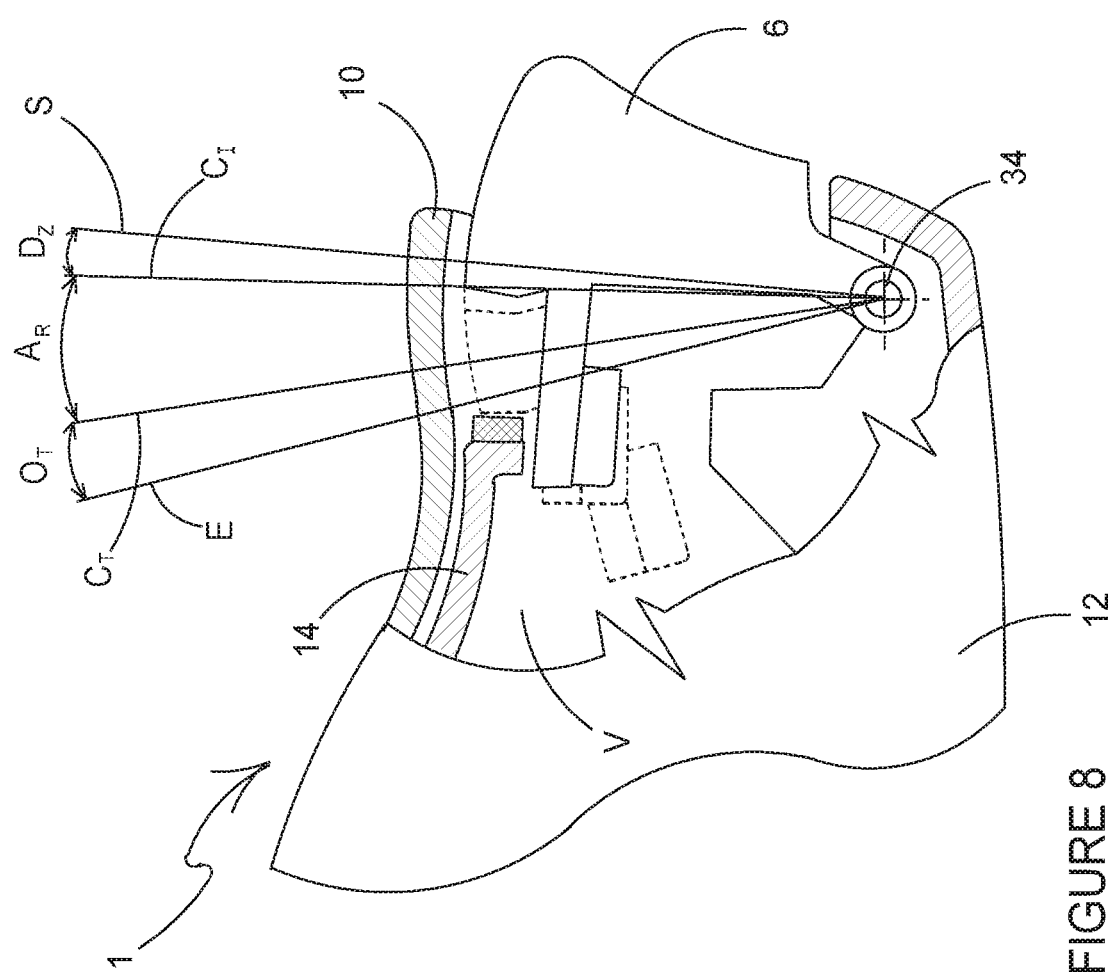
FIG. 8 is a cross sectional view of the trigger mechanism of FIG. 6 showing the range of motion of the trigger mechanism in an exemplary implementation of the use of the range of motion.
Figure 9:
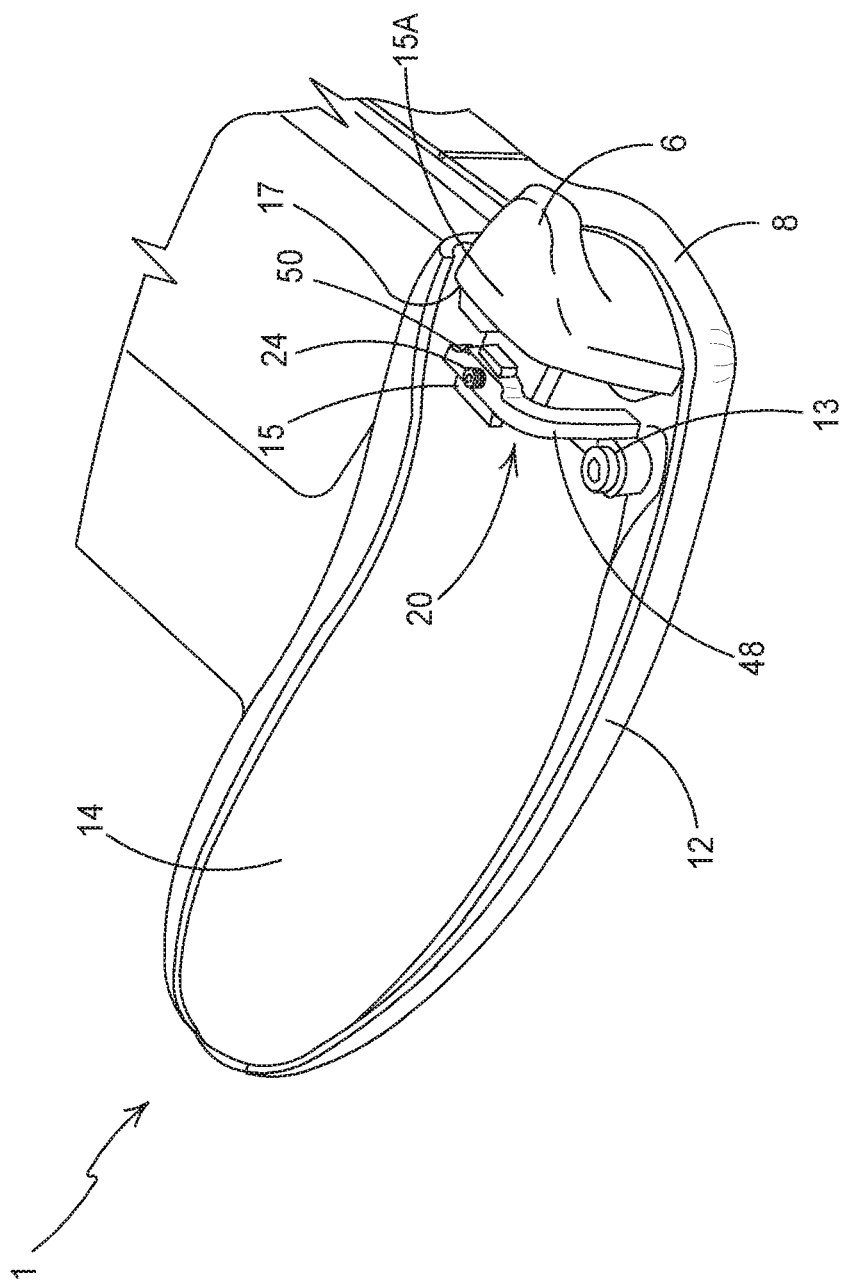
FIG. 9 is a perspective view from below of a portion of the controller of FIG. 1 in which the removable cover portion has been removed to expose a trigger adjustment mechanism according to a first embodiment of the invention.
Figure 10B:
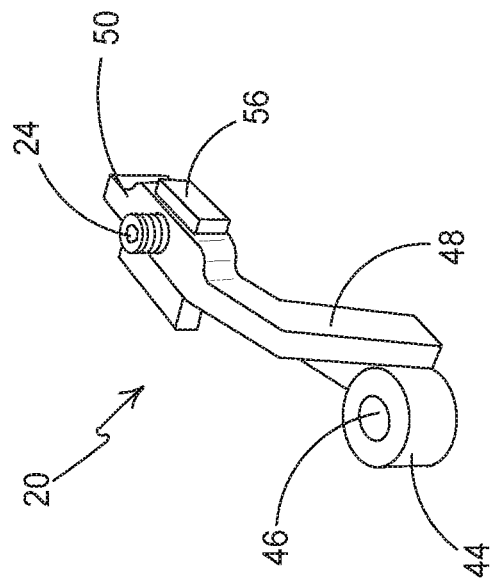
FIG. 10B is a perspective view of the mechanism for adjusting trigger travel motion.
Figure 10A:
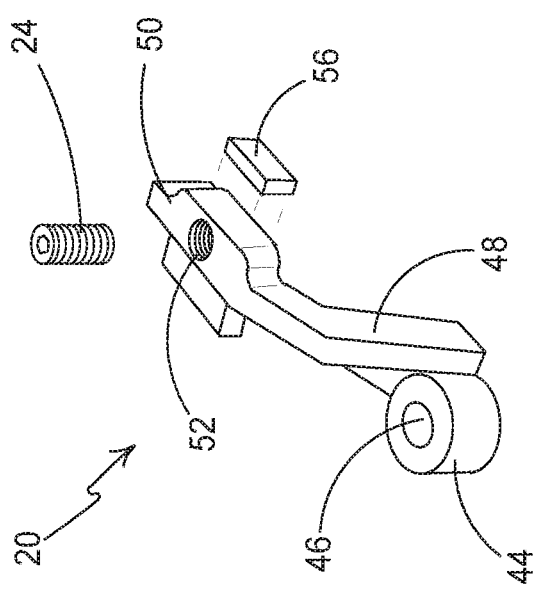
FIG. 10A is an exploded perspective view of the mechanism for adjusting trigger travel motion.

FIG. 8 illustrates a typical use of the range of motion of the trigger mechanism in a gaming application such as a combat style game. The trigger body 6 has a start position 'S'. The trigger body 6 must be moved through a first zone 'DZ', a dead zone in which no commands are initiated or issued. Once the trigger body 6 reaches the position 'CI' command actions begin to be issued. The trigger body 6 then moves through an active region 'AR' in which further command actions are carried out which effect game play. Once the trigger body 6 reaches the position 'CT', no further commands are initiated or issued. The trigger body 6 then enters an over travel zone 'OT' in which no commands are initiated or issued. The over travel zone 'OT' is another 'dead zone' and spans from position 'CT' until the trigger body 6 reaches the end stop 'E', at which point the movement of the trigger body 6 is arrested by the front edge 15 of the base chassis member 14.

Referring now to FIGS. 9 to 12 there is shown a first embodiment of a trigger adjustment system 20 that has a mechanism to allow the end user to control or recalibrate the range of motion of the trigger body of the left trigger mechanism. It will be appreciated that the trigger body 7 of a right trigger mechanism can be controlled or recalibrated by employing a system substantially similar to that described in relation to the left trigger mechanism and left trigger body 6, albeit in a mirror image form thereof.

The trigger adjustment system 20 comprises a base plate 44 in which a bore or aperture 46 is defined. The aperture 46 is configured to receive a fixing device 13 in the form of a screw or bolt. The trigger adjustment system 20 comprises a side wall or riser 48. The riser 48 and base plate 44 are configured to be received in the recess 16 defined in the base chassis member 14. The trigger adjustment system 20 comprises an arm 50 which extends from the riser 48; optionally the arm 50 extends from an upper end of the riser 48.

The arm 50 is arranged such that it extends between the rear edge 17 of the left trigger body 6 and the front edge 15 of the base chassis member 14.

The arm 50 comprises an aperture 52 which defines a bore. Optionally the bore comprises an internal screw thread for receiving a control screw 24. The control screw 24 is also referred to herein as a trigger adjustment control screw 24. In some embodiments control screw 24 takes the form of a grub screw; in other embodiments the control screw 24 comprises a head preventing the entire control screw 24 from passing through the arm 50. In other embodiments the control screw 24 may comprise other means for mechanically locating it within the aperture 52 at a selected location and, as such, the internal form of aperture 52 and/or the control screw 24 may have forms other than a conventional screw-type format.

Figure 7:
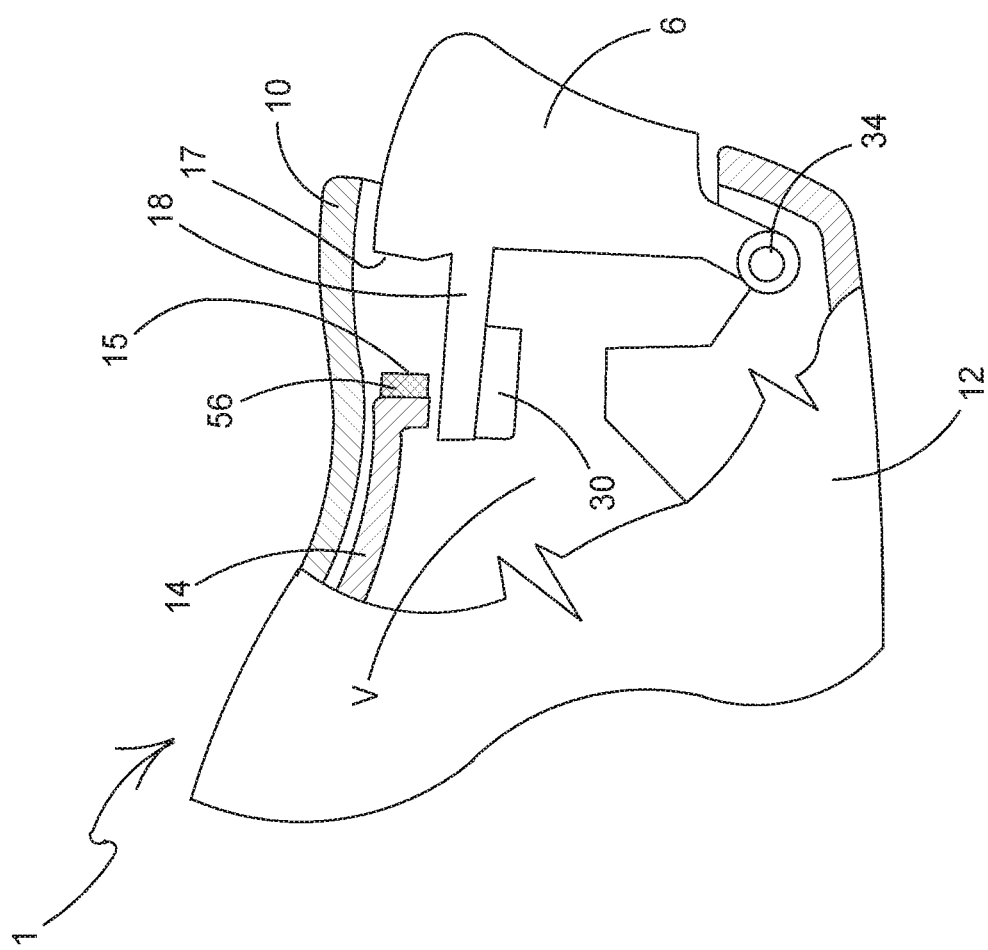
FIG. 7 is a cross sectional view of the trigger mechanism of FIG. 6.

As shown in FIG. 11, the position of the control screw 24 adjusts the start position of the trigger body 6. As indicated by direction narrow D1, the control screw 24 can be rotated to adjust the extent to which the control screw 24 passes through the arm 50. The lower end of the control screw 24 is brought into contact with the upper surface of the limb 18. As the control screw 24 is tightened into the aperture 52, the left trigger body 6 is pivoted about the pivot point 34 and is prevented from returning to the original start position, which original start position 'S' is shown in FIG. 7.

The arm 50 comprises a front edge 15A which provides an end stop for the range of motion of the left trigger body 6. FIG. 11 illustrates the left trigger body 6 in a first position; the first position is an initial start position in which the trigger body 6 is in an undepressed state. The left trigger body 6 is resiliently biased by a bias mechanism such as a spring to return to the first position. The front edge 15A is positioned closer to the rear edge of the left trigger body 6 than the position of the front edge 15 of the base chassis member 14. In this way the range of motion of the trigger body 6 is reduced or shortened. In this way the trigger adjustment system 20 adjusts the extent to which the left trigger body 6 can be depressed by a user. Hence, the degree of rotation of the left trigger body 6 about the pivot point 34 is restricted or reduced.

Figure 12:
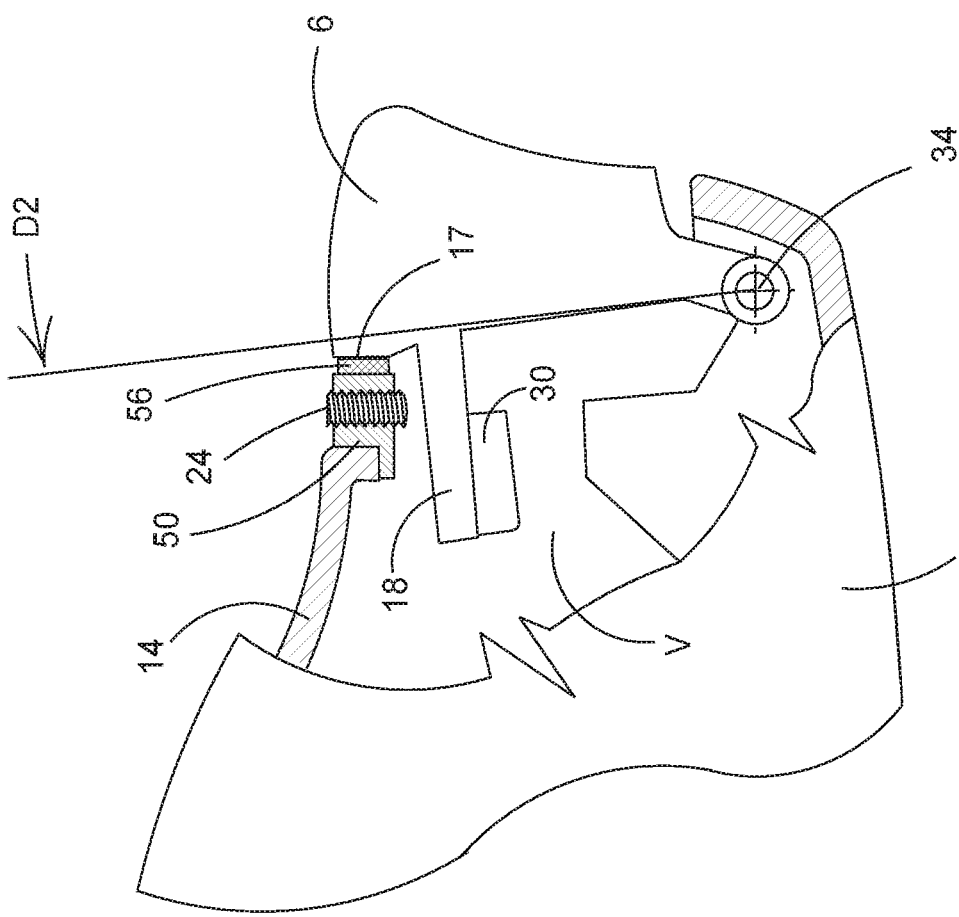
FIG. 12 is a cross sectional view of the trigger mechanism of FIG. 6 including the mechanism for adjusting trigger travel motion wherein the trigger body is illustrated in a second position.

FIG. 12 illustrates the left trigger body 6 in a second position. The second position is a terminal position in which the left trigger body 6 is in a new, fully depressed state. The motion, indicated by direction arrow D2, of the left trigger body 6 has been arrested or ceased by the front edge 15A of the arm 50, which may be referred to as a second end stop. Optionally, the arm 50 comprises a cushion member 56 for softening the impact between the trigger body 6 and the trigger adjustment system 20. As such, the second end stop may be provided by the cushion member 56.

In this embodiment the thread for receiving the control screw 24 is cut into the arm 50 of the trigger adjustment system 20. In other embodiments it would be possible to use a threaded insert in the arm 50.

Optionally, the position of the left trigger body 6 is adjusted by use of a specified tool that is provided to turn the control screw 24.

One advantage of the trigger adjustment system 20 of the present disclosure is that it allows adjustments to be made to the trigger mechanism's response characteristics. Further advantageously, the adjustment is not restricted to a factory calibration, but rather can be customised to suit the nature of the video game that is in use at the time of operation, and/or to suit the skill and preferences of the operator. For example in combat style games involving a shooting function it is often the case that a trigger needs to be depressed by a certain amount before any fire command is prompted. The provision of a mechanism for manual adjustment of a range of motion of a depressible trigger mechanism as herein described enables the range of trigger motion to be reduced. The control screw 24 can be adjusted so that the fire command is prompted within a shorter (desired) amount of depression of the trigger body 6; this may be referred to a "hair trigger". This adjustment can be made by using the required tool (for example an Allen key, or hex or star driver, cross head or flat head screwdriver, spanner or wrench) to turn the control screw 24, thereby driving it into or out of the arm 50 by virtue of the threaded insert or screw thread located therewithin.

After reaching or passing the command initiation point 'CI' no further commands are initiated by further movement of the left trigger body 6. The width of the arm 50 (and cushion 56 if provided) controls the degree of trigger body depression beyond the command initiation point 'CI'. The arm 50 restricts the amount of over travel available to the left trigger body 6 and may be referred to as a "trigger stop". The arm 50 impedes the movement of the left trigger body 6, since the rear edge 17 of the left trigger body 6 strikes the front edge 15A of the arm 50 (or cushion member 56 when present).

Adjustment of the range of motion of the trigger body 6 directly relates to control of game play and is especially relevant to the majority of combat style games or other varieties of firing operations in video games. The present invention nevertheless finds advantageous application in a variety of other video game genres but for the simplicity of this disclosure reference is made to combat style games.

A further advantage of the trigger adjustment system 20 of the present disclosure is that it minimises the amount of motion an operator's finger must travel, therefore minimising the recovery time after a trigger initiation command has been made, thus allowing the operator to commence the command prompt again and again more rapidly, or to operate different commands more quickly. The movement that is required to operate commands by depressing the left trigger body 6 is reduced and therefore risks associated with repetitive strain injury acquired due to the repeated movement of the operator's finger when operating the trigger mechanism may be greatly reduced.

Figure 13:
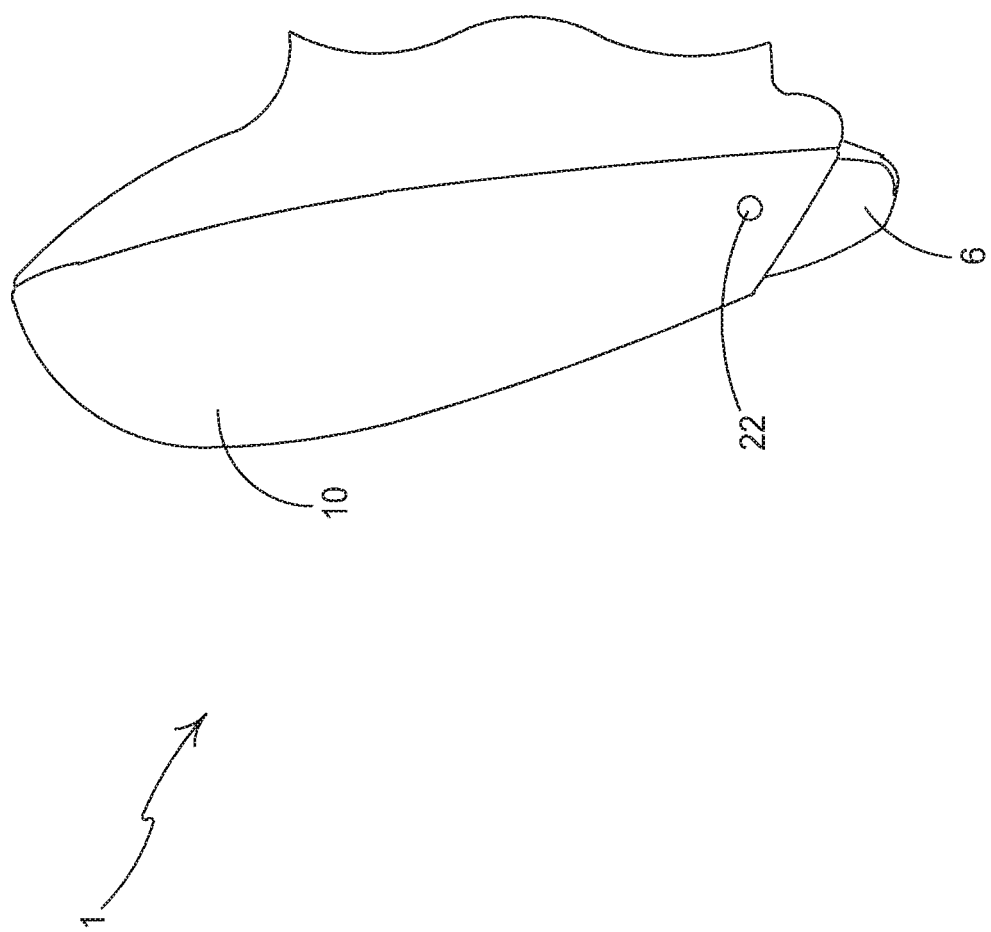
FIG. 13 is a bottom view of a portion of the controller of FIG. 6 including the removable cover portion.
Figure 14:
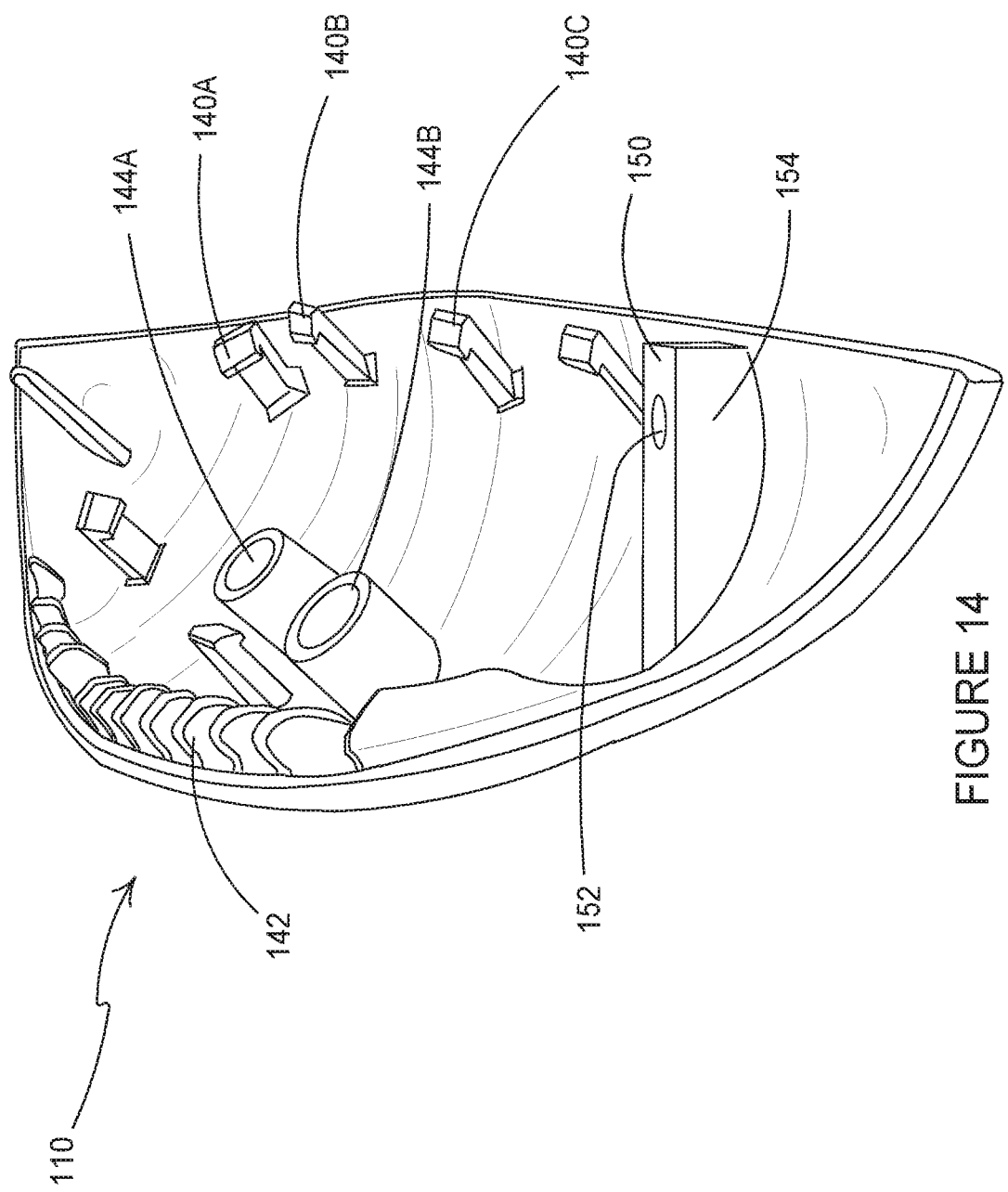
FIG. 14 is a perspective view of an alternative mechanism for adjusting trigger travel motion according to a second embodiment of the invention.

In one embodiment, illustrated in FIG. 13, the cover portion 10 comprises an access device in the form of an aperture 22, or 'through hole', which passes through the cover portion 10. The aperture 22 is configured such that it aligns with the control screw 24. In this way the operator can insert a tool through the aperture 22 and engage the control screw 24 to adjust the range of movement of the left trigger body 6 without the need to remove the cover portion 10. In other embodiments the cover portion 10 clips onto the base chassis member 14 by mechanical clips integrally formed therewith. The clips have a barb at one end to engage with a receiver. The cover portion 10 may be detached to adjust the control screw 24 or to remove the trigger adjustment system 20 to restore the full range of motion of the trigger body. Beneficially, therefore, the operator has full control over the manner in which his game controller operates.

FIGS. 14 to 17 illustrate a trigger adjustment system 120 according to a second embodiment. In the second illustrated embodiment, like numerals have, where possible, been used to denote like parts, albeit with the addition of the prefix "100" to indicate that these features belong to the second embodiment. The additional illustrated embodiment shares many common features with the first embodiment and therefore only the differences from the embodiment illustrated in FIGS. 1 to 13 will be described in any greater detail.

Figure 15:
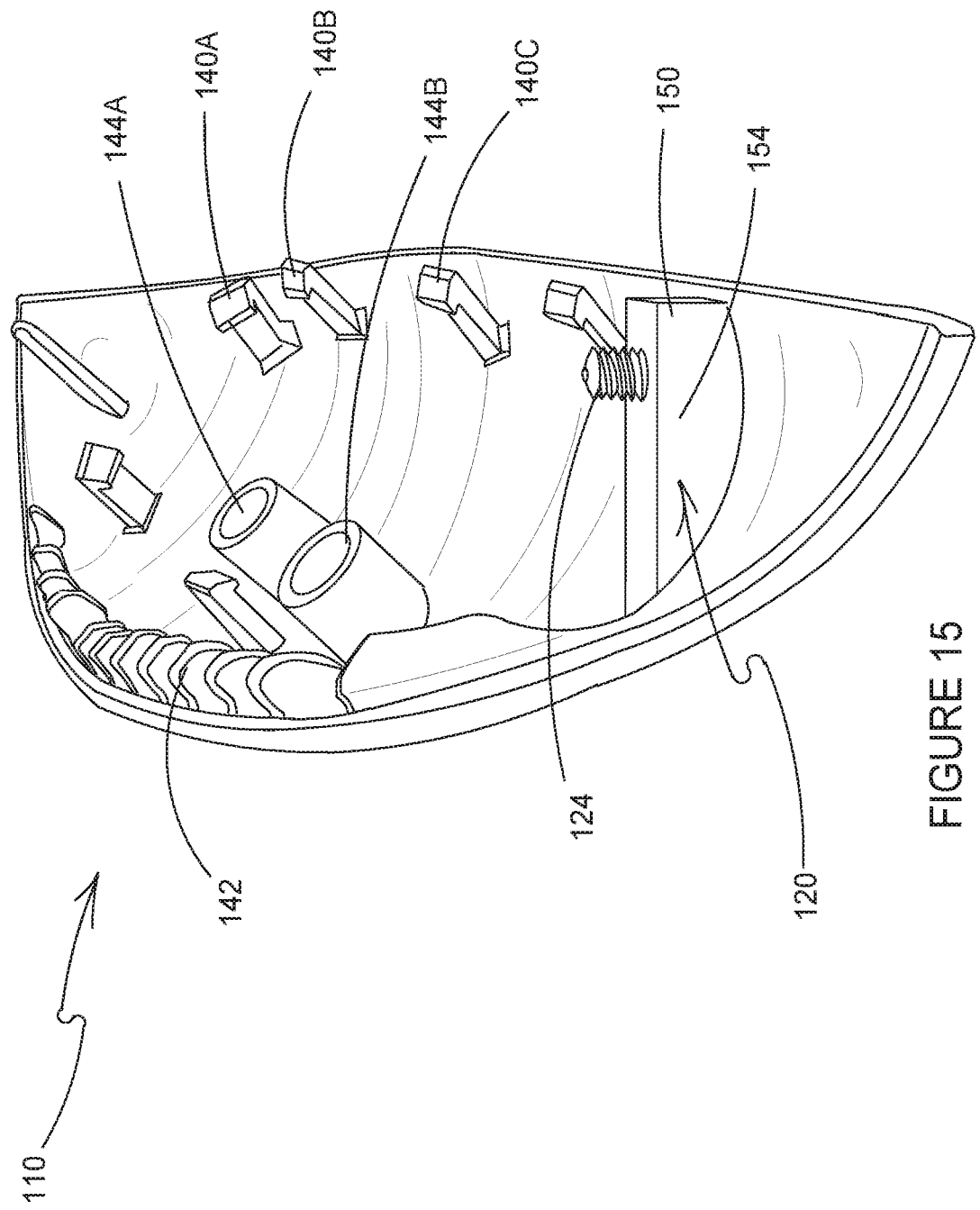
FIG. 15 is a perspective view of the alternative mechanism for adjusting trigger travel motion of FIG. 14 showing an adjustment device.
Figure 16:
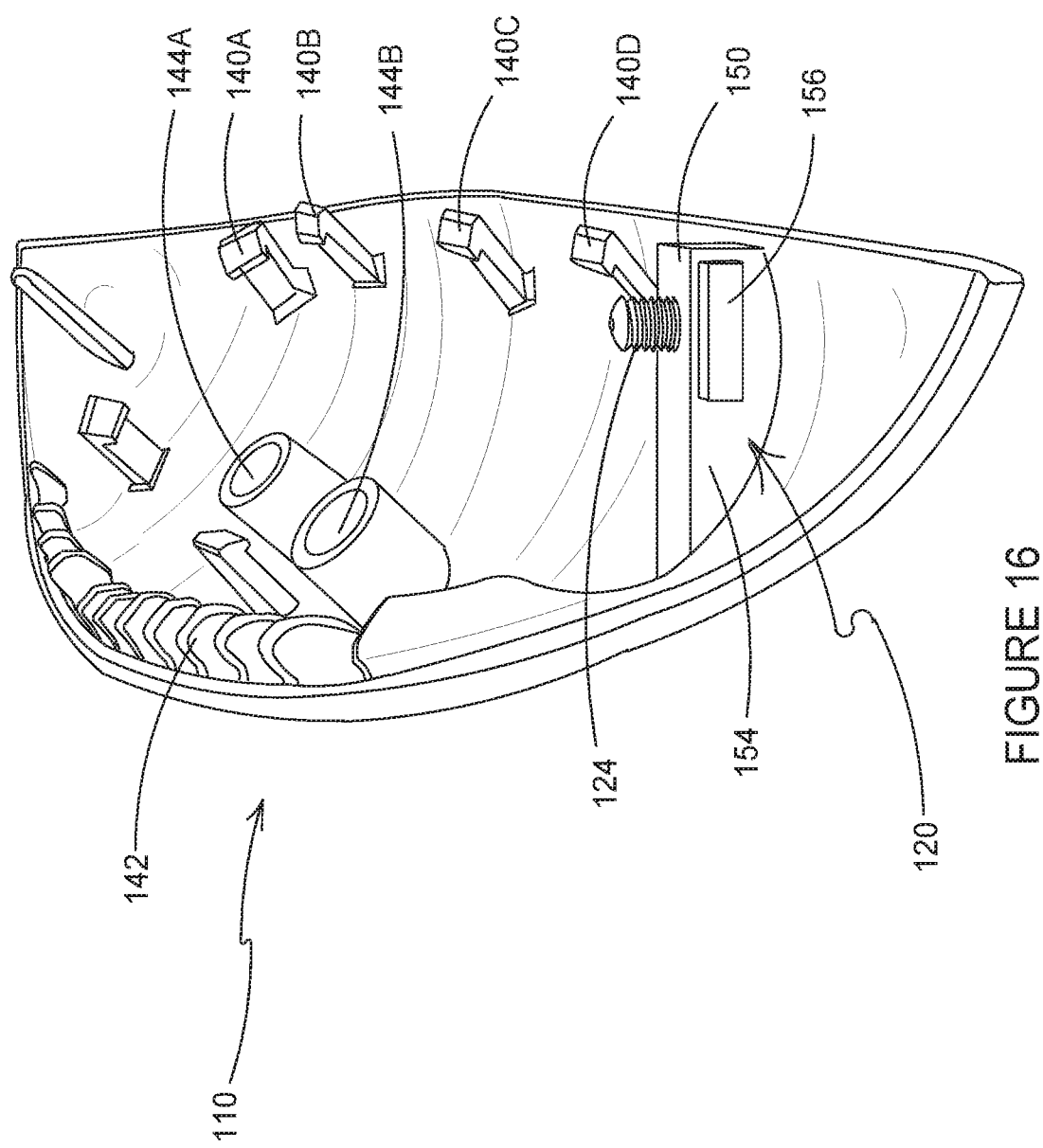
FIG. 16 is a perspective view of the alternative mechanism for adjusting trigger travel motion of FIG. 14 showing an optional end stop device.

The cover portion 110 comprises a protrusion which forms a housing 150 for mounting a control screw 124 (see FIG. 15). The housing 150 comprises an aperture or bore 152 therethrough. The bore 152 extends from an outer surface of the cover portion 110 through to an inner surface thereof. Optionally, the bore 152 comprises an internal screw thread for mating with an external thread of the control screw 124. In some embodiments the control screw 124 may comprise a self-tapping screw thread and cuts into the material forming the bore 152. The cover portion 110 is optionally manufactured from a plastic material and in such embodiments an insert may be placed into the bore 152, the insert comprising an internal screw thread for receiving the control screw 124. The insert may be manufactured from a different material such as, but not limited to, metal. Optionally, the housing 150 is integrally moulded with the cover portion 110. In other embodiments the control screw 124 may comprise other means for being mechanically located at one of a range of available locations, and the bore 152 or an insert therefor may have a corresponding and complementary form.

In alternative embodiments the housing 150 is formed as a separate component and is secured or bonded to the inner surface of the cover portion 110. In such embodiments an aperture is provided in the cover portion 110 and the bore 152 in the separate housing 150 is aligned with the aperture in the cover portion 110.

Figure 17:
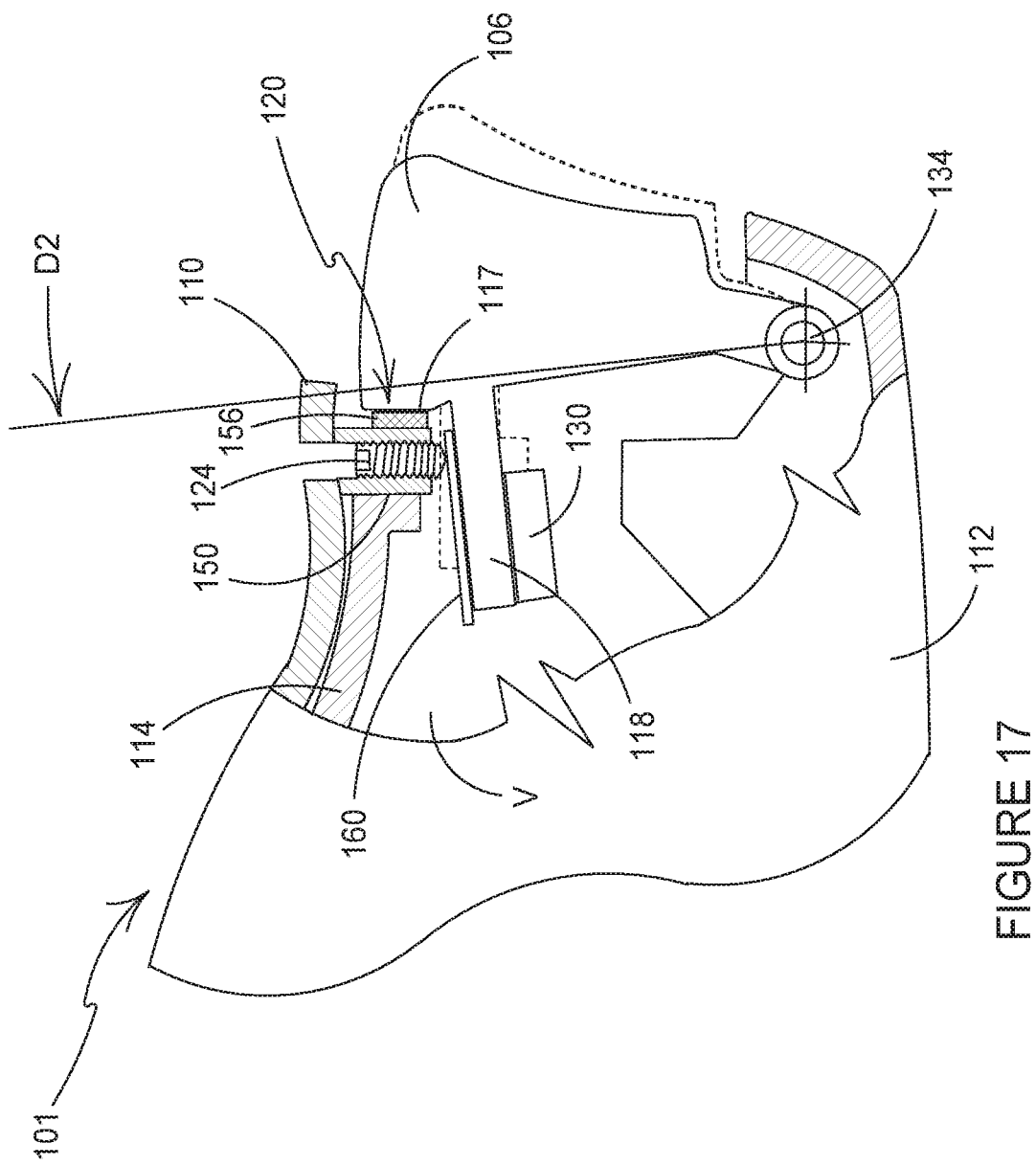
FIG. 17 is a cross sectional view of the trigger mechanism of FIG. 14 including the mechanism for adjusting trigger travel motion wherein the trigger body is illustrated in a depressed position.

Optionally, the trigger adjustment system 120 comprises a cushioning member or soft end stop 156, and the soft end stop 156 is made from a material that is deformable such as, but not limited to, a foam or rubberised material. In this way the soft end stop 156 absorbs some of the kinetic energy when the trigger body 106 meets the end stop provided by the front face 154 of the housing 150 as shown in FIG. 17.

Optionally, the trigger adjustment system 120 comprises a strike plate 160; the strike plate 160 is mounted to an upper face of the limb 118. The strike plate 160 is optionally formed of a material having a hardness which is equal to or greater than the hardness of the material forming the control screw 124. In this way the control screw 124 is prevented from deforming or cutting into the limb 118. This avoids the control screw 124 becoming snagged or caught up on the limb 118 and provides more accurate control over the position of a trigger body, and greater repeatability.

It will be recognised that as used herein, directional references such as "top", "bottom", "front", "back", "end", "side", "inner", "outer", "upper" and "lower" do not necessarily limit the respective features to such orientation, but may merely serve to distinguish these features from one another.

While particular embodiments of the invention have been shown and described, numerous variations and alternate embodiments will occur to those skilled in the art without departing from the scope of the present invention.

It will be recognised that the provision of a trigger adjustment system 20, 120 has been described in the context of a single trigger body 6, 106 of a depressible trigger mechanism. It is envisaged that one or more aspects of the trigger adjustment systems 20, 120 disclosed herein may find beneficial application for adjusting the range of travel of a variety of control actuators provided on game controllers including, by way of non-limiting examples, buttons, sticks, bumpers and triggers. A game controller according to the disclosure may comprise one or more actuators and as such, one or more trigger adjustment systems. It is envisaged that in some embodiments a game controller may comprise a first adjustment system 20, 120 for a first actuator mechanism for repositioning the first and second end-stop positions of an actuator body thereof and may comprise a second adjustment system 20, 120 for a second actuator mechanism for repositioning first and second end-stop positions of an actuator body thereof. The first and second adjustment systems 20, 120 may be of the same type (albeit optionally differently handed ones) or of different types.

The invention claimed is:

1. An apparatus for supplying user inputs to a computer program to control the computer program, the apparatus comprising:
   a controller chassis;
   a removable cover portion mountable to the controller chassis;
   at least one trigger device pivotally mounted to the controller chassis, the trigger device comprising:
      a front portion configured to be activated by a user, and
      a rear portion opposite the front portion, the rear portion contained within an internal volume formed by the controller chassis and configured to move along a pathway in response to activation of the front portion; and
   a trigger adjustment mechanism configured to adjust a range of motion of the trigger device, the trigger adjustment mechanism being mounted to an internal surface of the removable cover portion such that when the removable cover portion is mounted to the controller chassis the trigger adjustment mechanism is disposed entirely within the internal volume defined by an outer case of the apparatus and in the pathway of the rear portion of the trigger device.

2. The apparatus of claim 1, wherein the trigger adjustment mechanism is configured to adjust an end position of the trigger device when depressed.

3. The apparatus of claim 1, wherein the trigger adjustment mechanism is configured to shorten the range of motion of the trigger device.

4. The apparatus of claim 1, wherein the removable cover portion includes an aperture and wherein the trigger adjustment mechanism is configured to be manually adjusted through the aperture.

5. The apparatus of claim 4, wherein the trigger adjustment mechanism is configured to be manually adjusted by an adjustment tool inserted into the aperture.

6. The apparatus of claim 1, wherein the removable cover portion comprises a grip portion configured to be held in a hand of the user during operation of the apparatus.

7. The apparatus of claim 1, wherein the apparatus comprises a game controller.

8. The apparatus of claim 1, wherein the computer program comprises a game program.

9. The apparatus of claim 1, wherein the removable cover portion is configured to be mountable to the controller chassis without the use of tools.

10. An apparatus for supplying user inputs to a computer program such as a game program for controlling the game program, the apparatus comprising:
a case;
at least one depressible trigger rotationally attached to the case, the depressible trigger comprising:
a first surface which extends outside the case, the first surface configured to be activated by a user, and
a second surface opposite the first surface, the second surface moving in response to activation of the first surface by the user; and
a mechanism for manual adjustment of a range of motion of the at least one depressible trigger, the mechanism coupled to a removable portion of the case such that when the removable portion is attached to the case, the mechanism is disposed entirely within an internal volume defined by the case and is disposed in a travel path of the second surface of the depressible trigger.

11. The apparatus of claim 10, wherein the mechanism is configured to adjust a stop position of the depressible trigger when depressed.

12. The apparatus of claim 10, wherein the mechanism is configured to shorten the range of motion of the depressible trigger device.

13. The apparatus of claim 10, wherein the removable portion of the case includes an aperture and wherein the mechanism is configured to be manually adjusted through the aperture.

14. The apparatus of claim 13, wherein the mechanism is configured to be manually adjusted by an adjustment tool inserted into the aperture.

15. The apparatus of claim 10, wherein the removable portion comprises a grip portion configured to be held in a hand of the user during operation of the apparatus.

16. The apparatus of claim 10, wherein the removable portion is configured to be attached to the outer case without the use of tools.

17. A removable cover for attachment to a computer input device, the computer input device comprising a case and a depressible trigger pivotally attached to the case, the removable cover configured to be removably attached to the case, the removable cover comprising:
a stop mechanism for manual adjustment of a range of motion of the depressible trigger, the stop mechanism affixed to an inner surface of the removable cover such that when the removable cover is attached to the case of the computer input device:
the stop mechanism is disposed entirely within an internal volume defined by the case and
the stop mechanism is disposed in a travel path of the of the depressible trigger.

18. The removable cover of claim 17, wherein the stop mechanism is configured to manually adjust an end position of the depressible trigger.

19. The removable cover of claim 17, wherein the removable cover is configured to be attached to the case without using tools.

20. The removable cover of claim 17, wherein the removable cover comprises a handle portion configured to be held by a user during operation of the computer input device.

* * * * *